(12) United States Patent
Huang et al.

(10) Patent No.: US 6,611,835 B1
(45) Date of Patent: Aug. 26, 2003

(54) SYSTEM AND METHOD FOR MAINTAINING UP-TO-DATE LINK INFORMATION IN THE METADATA REPOSITORY OF A SEARCH ENGINE

(75) Inventors: Anita Wai-Ling Huang, Oakland, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/565,129

(22) Filed: May 4, 2000

(51) Int. Cl.⁷ .............................................. G06F 17/30
(52) U.S. Cl. .................... 707/10; 707/100; 707/200; 715/513
(58) Field of Search ................... 707/104.1, 3, 10, 707/513, 100, 200; 709/223; 715/513

(56) References Cited

U.S. PATENT DOCUMENTS

| | | | |
|---|---|---|---|
| 5,185,885 A | | 2/1993 | Dysart et al. |
| 5,606,669 A | | 2/1997 | Bertin et al. ................. 707/100 |
| 5,761,683 A | | 6/1998 | Logan et al. ................. 709/223 |
| 5,787,442 A | | 7/1998 | Hacherl et al. .............. 715/513 |
| 5,794,006 A | | 8/1998 | Sanderman .................. 707/201 |
| 5,802,299 A | | 9/1998 | Logan et al. ................. 709/223 |
| 5,806,065 A | | 9/1998 | Lomet .......................... 709/218 |
| 5,878,434 A | | 3/1999 | Draper et al. ................ 707/202 |
| 5,898,836 A | * | 4/1999 | Freivald et al. .............. 715/513 |
| 5,978,828 A | * | 11/1999 | Greer et al. ................... 707/10 |
| 5,983,268 A | * | 11/1999 | Freivald et al. .............. 715/513 |
| 6,253,198 B1 | * | 6/2001 | Perkins .......................... 707/10 |
| 6,278,992 B1 | * | 8/2001 | Curtis et al. ................. 707/100 |

* cited by examiner

*Primary Examiner*—Greta Robinson
(74) *Attorney, Agent, or Firm*—Morgan & Finnegan; Alison D. Mortinger; Marc D. McSwain

(57) ABSTRACT

A system and method for updating search engine information that is more efficient, less time-consuming, and less costly than prior techniques. In order to carry out the method a uniform resource locator indicating a Web page for which the search engine information is to be updated is selected. The selected uniform resource locator is transmitted to a server on which the Web page is located. A response code indicating a status of the Web page is received and the search engine information is updated based on the response code.

18 Claims, 9 Drawing Sheets

SYSTEM AND METHOD FOR MAINTAINING UP-TO-DATE LINK INFORMATION IN THE METADATA REPOSITORY OF A SEARCH ENGINE

FIELD OF THE INVENTION

The present invention relates to a system and method for maintaining up-to-date Web page link information in a metadata repository that is part of a Web search engine.

BACKGROUND OF THE INVENTION

The World Wide Web service (Web) of the Internet is an increasingly popular tool for communicating information. The volume of information available on the Web is so great that users seeking information require help, in the form of search engines. Conventional search engines examine available information, such as Web pages and files, and generate indexes relating search terms to links (URLs) which point to the information. All search engines face the challenge of keeping their indexes current. Indexes go out of currency because Web authors often move or remove files from previous locations, which have been indexed. Attempts to follow links to these pages or files result in error.

Due to such changes, which are constantly occurring, it is imperative for search engines to constantly update their indexes to avoid returning, as a result of a query by a user, URLs that reference datasources (documents) that are missing or have been moved. Conventional methods of updating search engine indexes tend to be time-consuming and costly to perform. A need arises for a faster and less expensive technique for updating search engine indexes.

An additional problem arises when a search engine maintains link structure information. Link structure information may be maintained for several purposes, such as for generating rank information of search results. Rank information is useful to the user because it allows the search engine to present query results in order of those links that are more likely to be relevant to the query. Typically, link structure information is stored in a metadata repository. In this situation, the search engine must also update all of the metadata for pages which contain links to or were linked from the outdated URL. This additional required updating is even more time consuming and costly. A need arises for a technique by which search engine indexes and link structure information can be updated more efficiently than with prior techniques, which will provide time and cost savings.

SUMMARY OF THE INVENTION

The present invention is a system and method for updating search engine indexes and link structure information that is more efficient, less time-consuming and less costly than prior techniques. The present invention provides improved updates to metadata link information for Web pages which have been permanently moved or have been deleted. In addition to using the database architecture present in the search engine, the present invention takes advantage of the RDF format of the metadata. For a search engine which indexes structural as well as textual information, the present invention provides an efficient way to keep the metadata repository up-to-date without having to download and recrawl all the pages. Only the response code and location are required from the server. The database link table serves as a solid reference to the parent-child structure of the engine's domain. The present invention takes advantage of this resource to maintain and update rich summaries of Web data. The present invention is also extensible to handle other URL status changes.

The present invention is a system and method for updating search engine information. In order to carry out the method a uniform resource locator indicating a Web page for which the search engine information is to be updated is selected. A server on which the indicated Web page is located is contacted to obtain the Web page. A response code indicating a status of the Web page is received and the search engine information is updated based on the response code.

The response code may indicate that the Web page cannot be found, and the updating step may comprise the step of deleting information relating to the Web page from the search engine information. The response code may indicate that the Web page has been moved, and the updating step may comprise the step of modifying information relating to the Web page that is included in the search engine information.

In order to carry out the deleting step, a plurality of parent uniform resource locators related to the selected uniform resource locator are received. All instances of the selected uniform resource locator are deleted from the search engine information. Metadata summarizing Web pages is updated, the metadata referencing the selected uniform resource locator and metadata summarizing the Web page indicated by the selected uniform resource locator is deleted.

In order to carry out the step of updating metadata summarizing Web pages, existing RDF summaries for each parent uniform resource locator in the search engine information may be modified to remove references to the selected uniform resource locator and annotation information from its list of out-links. Alternatively, the step of updating metadata summarizing Web pages may be carried out by resummarizing metadata information for each parent uniform resource locator in the search engine information to create new RDF summaries with updated information.

In order to carry out the modifying step, a uniform resource locator indicating a new location of the Web page indicated by the selected uniform resource locator is received. A plurality of parent uniform resource locators and child uniform resource locators related to the selected uniform resource locator are received. All instances of the selected uniform resource locator are replaced with the uniform resource locator indicating the new location of the Web page. Metadata summarizing Web pages is updated, the metadata referencing the selected uniform resource locator. The uniform resource locator indicating the new location of the Web page is crawled to update metadata summarizing the Web page and metadata summarizing the Web page indicated by the selected uniform resource locator is deleted.

In order to update metadata summarizing Web pages, existing RDF summaries for each parent uniform resource locator in the search engine information may be modified by replacing the selected uniform resource locator with the uniform resource locator indicating the new location of the Web page with the new URL among the plurality of parent uniform resource locators and child uniform resource locators related to the selected uniform resource locator. Alternatively, metadata summarizing Web pages may be updated by summarizing each parent uniform resource locator and child uniform resource locator among the received parent uniform resource locators and child uniform resource locators to create new RDF summaries.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
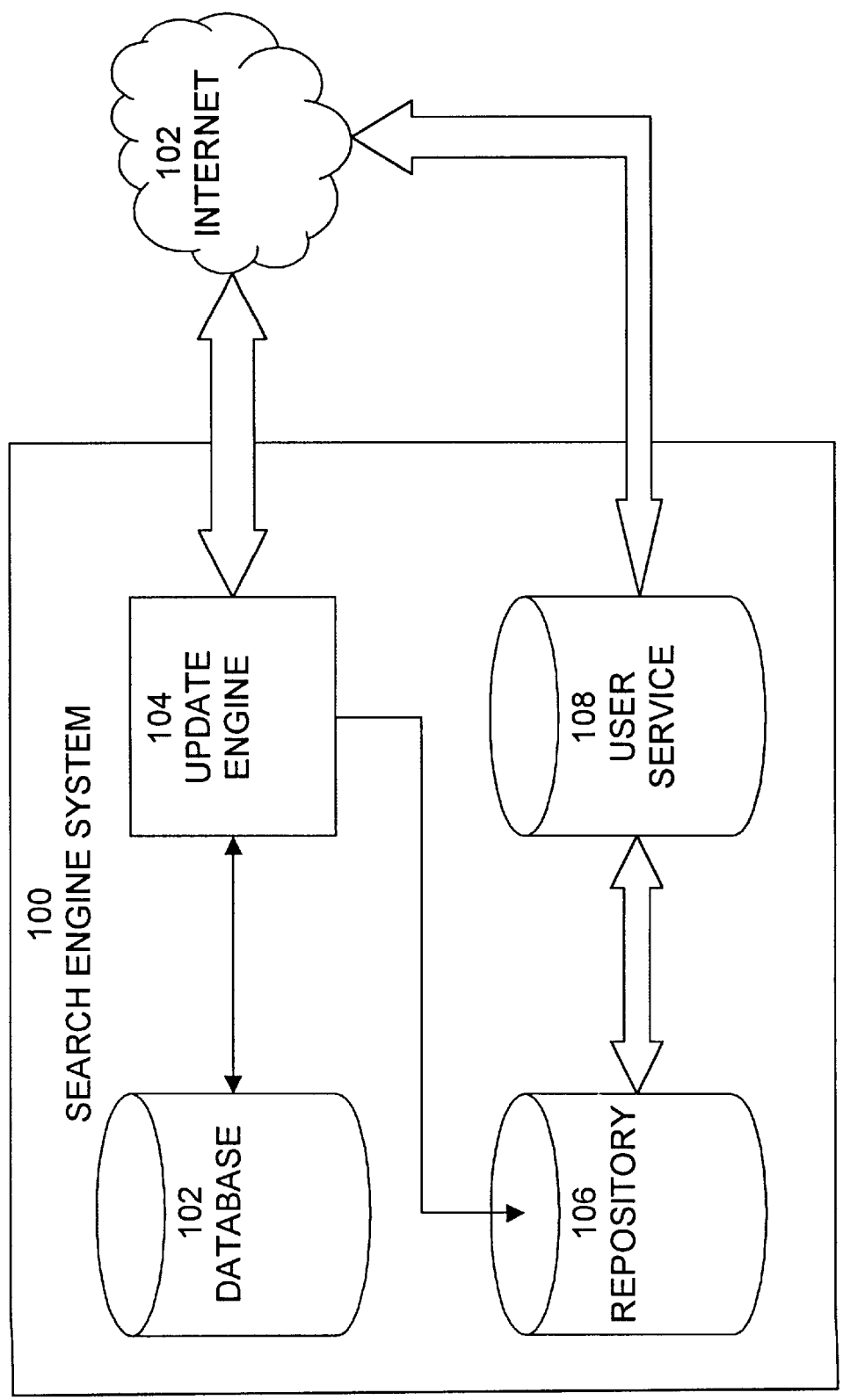
FIG. 1 is an exemplary block diagram of a search engine system in which the present invention may be implemented.

An exemplary block diagram of a search engine system 100, in which the present invention may be implemented, is shown in FIG. 1. System 100 includes database 102, update engine 104, metadata repository 106, and user service block 108. Database 102 stores information relating to Web pages obtained by crawling the Web. Update engine 104 performs the processing that implements the present invention in system 100. Repository 106 stores metadata that summarizes the information relating to Web pages that is stored in database 102. User service block 108 provides Web-searching services to users. Update engine 104 and user service block 108 are communicatively connected to the Internet 110.

Although, in FIG. 1, database 102, update engine 104, repository 106, and user service block 108 are all shown separately, this is only an example. One of skill in the art would recognize that these components may be combined, integrated, or distributed in a variety of ways. For example, update engine 102 may be integrated with database 102, repository 106, and/or user service block 108. Conversely, each component may be distributed among several hardware systems. The choice of arrangement of combination, integration, and distribution of components is an implementation decision, based on factors such as, cost, performance, etc. Any and all such arrangements are contemplated by the present invention.

Figure 2:
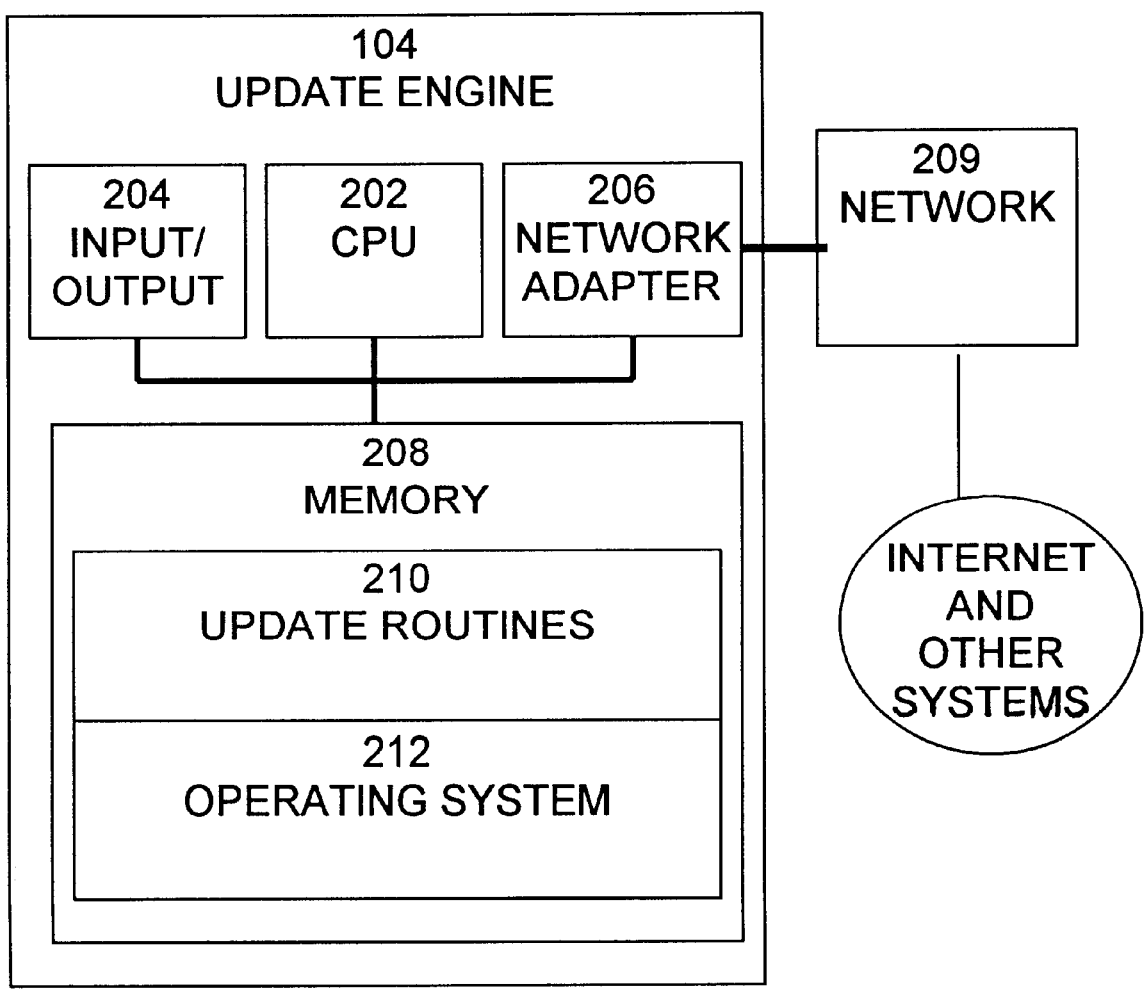
FIG. 2 is a more detailed block diagram of an update engine shown in FIG. 1.

Update engine 104 is shown in more detail in FIG. 2. Update engine 104 typically is, or is included in, a programmed general-purpose computer system, such as a personal computer, workstation, server system, and minicomputer or mainframe computer. Update engine 104 includes processor (CPU) 202, input/output circuitry 204, network adapter 206, and memory 208. CPU 202 executes program instructions in order to carry out the functions of the present invention. Typically, CPU 202 is a microprocessor, such as an INTEL PENTIUM® processor, but may also be a minicomputer or mainframe computer processor. Input/output circuitry 204 provides the capability to input data to, or output data from, computer system 200. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces update engine 104 with the network 209, which provides communication with the Internet and other systems, such as repository 106 and search engine 108. Network 209 may be any standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of the present invention. Memory 208 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface. Memory 208 includes a plurality of blocks of program instructions, such as update routines 210, and operating system 212. Update routines 210 perform the Web page link information updates of the present invention. Operating system 212 provides overall system functionality.

Figure 3:
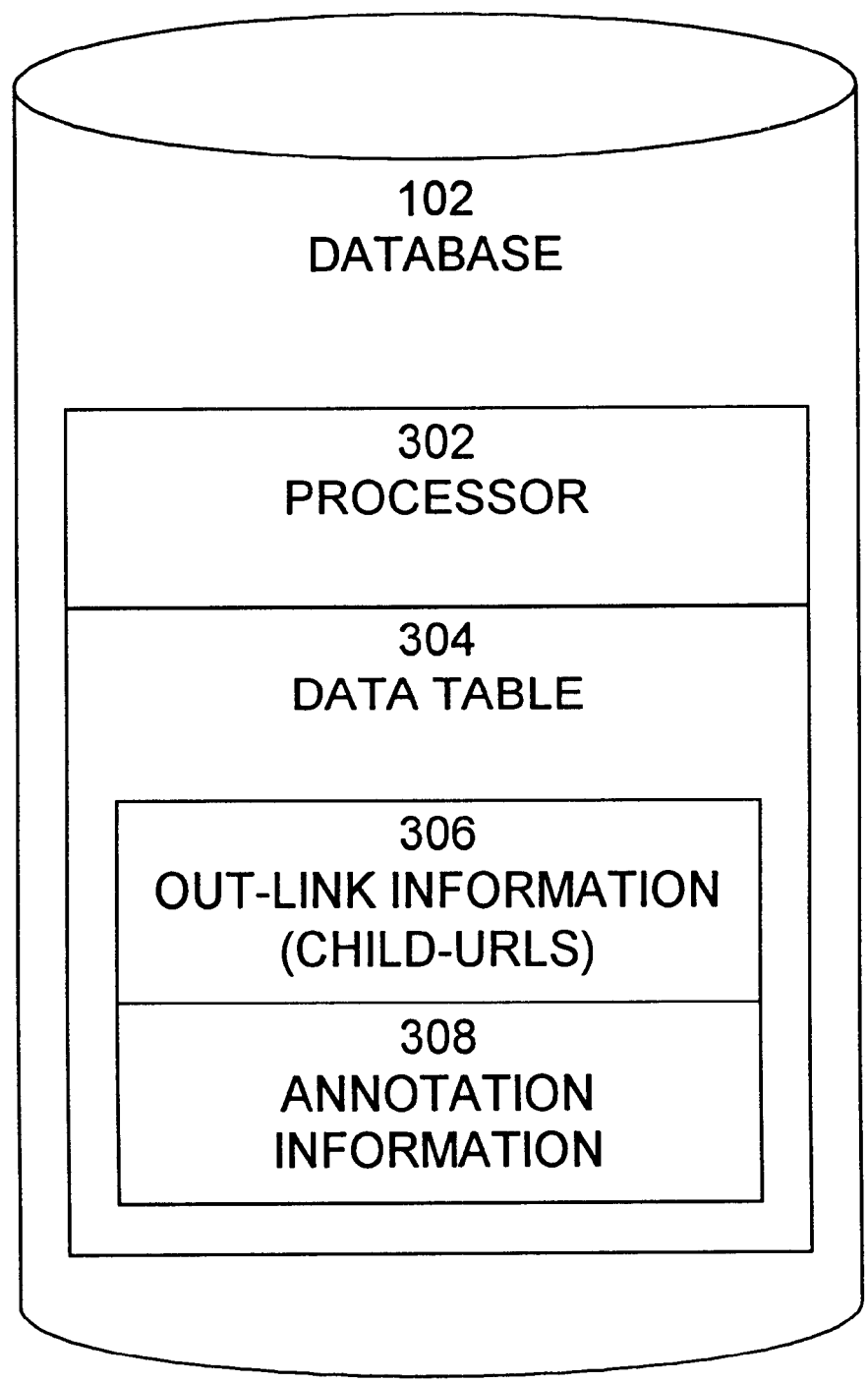
FIG. 3 is a more detailed block diagram of a database shown in FIG. 1.

Database 102, shown in FIG. 1, is shown in more detail in FIG. 3. In the arrangement shown in FIG. 1, database 102 is typically communicatively connected to update engine 104 via network 209. If database 102 is a separate system, as shown in FIG. 1, database 102 includes processor 302, which is typically a programmed general purpose computer system similar to that shown in FIG. 2. If database 102 is combined or integrated with one or more other system components shown in FIG. 1, then database 102 utilizes processing functionality integrated with that component or components.

Database 102 also includes data table 304 storing information relating to pages found on the Web. Preferably, the information is stored as a data base table, which stores link information. The stored information is obtained by a well-known process termed "Web crawling". A Web crawling process, preferably implemented in update engine 104, traverses a substantial number of Web pages. The Web crawling process stores all the out-links 306, termed "child-URLs", for each page crawled, in data table 304. Annotation information 308 for each child-URL, which includes various text and metadata elements found in close proximity to the out-link, are also stored in data table 304. In this way, the table ultimately acquires information about both the out-links (child-URLs) and the in-links, termed parent-URLs, associated with a page.

Figure 4:
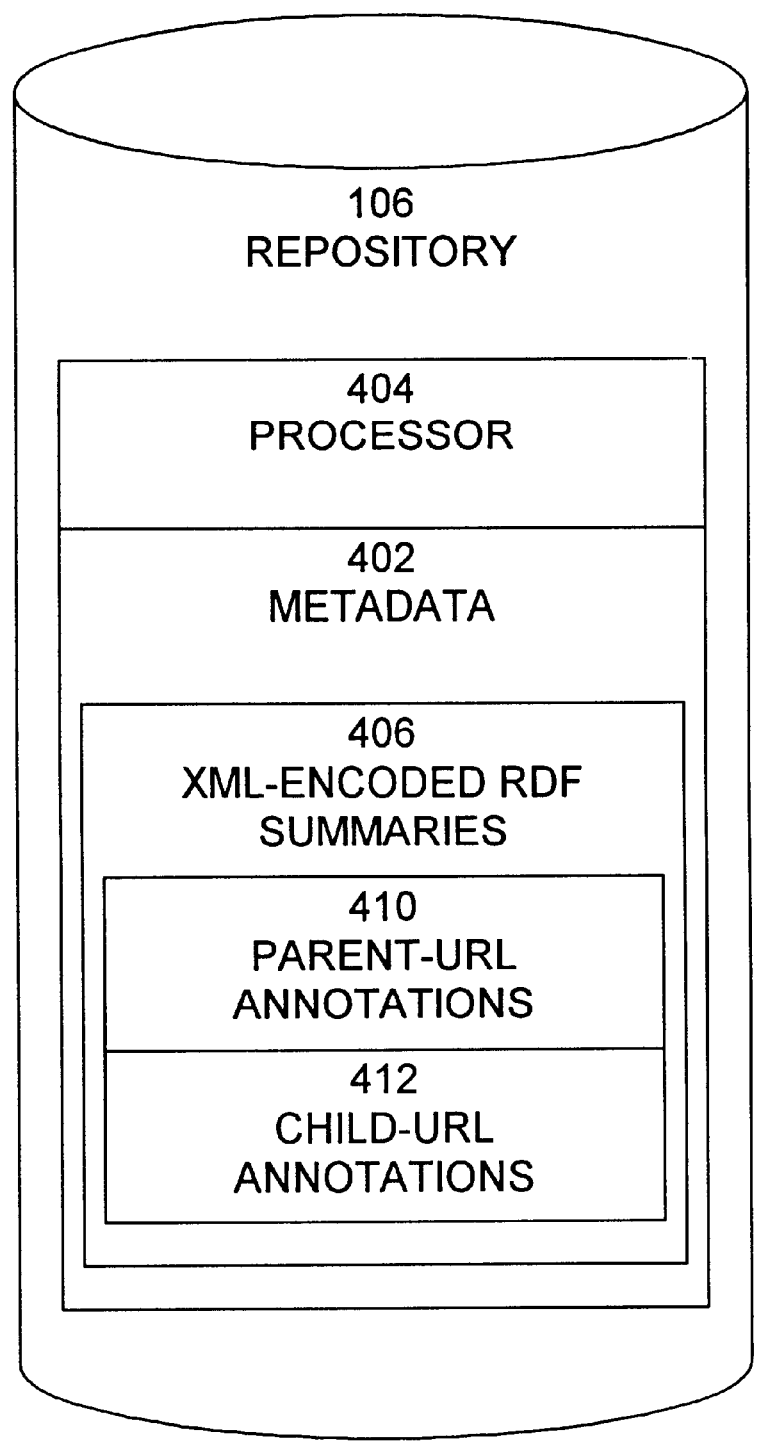
FIG. 4 is a more detailed block diagram of a metadata repository shown in FIG. 1.

The Web-crawling process generates metadata to summarize the Web data stored in data table 304. The metadata 402 is stored in repository 106 of FIG. 1, which is shown in more detail in FIG. 4. In the arrangement shown in FIG. 1, repository 106 is typically communicatively connected to update engine 104 via network 209. If repository 106 is a separate system, as shown in FIG. 1, repository 106 includes processor 404, which is typically a programmed general purpose computer system similar to that shown in FIG. 2. If repository 106 is combined or integrated with one or more other system components shown in FIG. 1, then repository 106 utilizes processing functionality integrated with that component or components.

In order to generate metadata, the Web-crawling system accesses the data table 304 to enhance the summary. Using the table, the crawlers generate XML-encoded RDF summaries 406, which include, among other metadata, a list 410 of annotations made by parent-URLs and a list 412 of annotations made about child-URLs. These summaries form the metadata repository which feeds the index server for the search engine.

In general, the Web crawling process involves the automatic and recursive retrieval of web pages. The crawling program or system (crawler) first fetches a single Web page and then proceeds to fetch all of the web pages referenced by the hyperlinks in the first web page. The crawler recursively repeats this process to a predefined depth (number of levels) or indefinitely. Throughout the crawling process, the crawler generates and stores metadata information for each of the Web pages that it fetches. The metadata information is used by a search engine to index the Web page.

Metadata is "data about data." For example, a library catalog is metadata, since it describes publications. More particularly, in the context of the present invention, metadata refers to data describing Web resources. The distinction between "data" and "metadata" is not an absolute one; it is a distinction created primarily by a particular application, and many times the same resource will be interpreted in both ways simultaneously. Examples of metadata that will be include "Title", "Author" (or "Creator"), "Publisher", and "Format".

In addition, the metadata about a particular Web page includes link-structure information, which describes the hyperlinks to and from the given page. The crawler keeps track of this information by storing parent-child relationships in a relational database table during the crawling process. More particularly, the crawler fetches a Web page whose location is indicated by a particular URL. The Web page includes hyperlinks to other Web pages whose locations are also indicated by URLs. The crawler records each of the hyperlinked URLs as a "child-URL" of the URL of the first page, the "parent-URL".

The metadata about a particular Web page also includes the annotations that other Web pages make about the given Web page. During the crawling process, the crawler stores this information in the relational database along with the parent-child relationships. In particular, the crawler extracts the text and other data found in the vicinity of each hyperlink contained within the parent page and stores this data as an annotation of the parent-child relationship. The data acts as metadata pertaining to the child page as provided by the parent page.

In the crawling process, the crawler generates a summary page for each page that it fetches using such metadata. In order to generate the summary, the crawler fetches a page, parses it and extracts from it relevant information for the summary, such as annotation and link-structure information, modification date, abstract of presentation text, etc. In addition, the crawler fetches from the database previously gathered metadata information for the page, such as the annotations that parent-pages provide for the fetched page. The crawler consolidates this information (metadata) as a structured summary using Resource Description Framework.

Resource Description Framework (RDF) is a foundation for processing metadata. It provides interoperability between applications that exchange machine-understandable information on the Web. RDF emphasizes facilities to enable automated processing of Web resources. RDF is to be used in a variety of application areas.

Extensible Markup Language (XML) is a meta-language that provides a framework or set of rules to specify domain specific languages. Each language defines a text format for representing structured data within the domain. RDF is one example of a domain-specific XML language.

Figure 5:
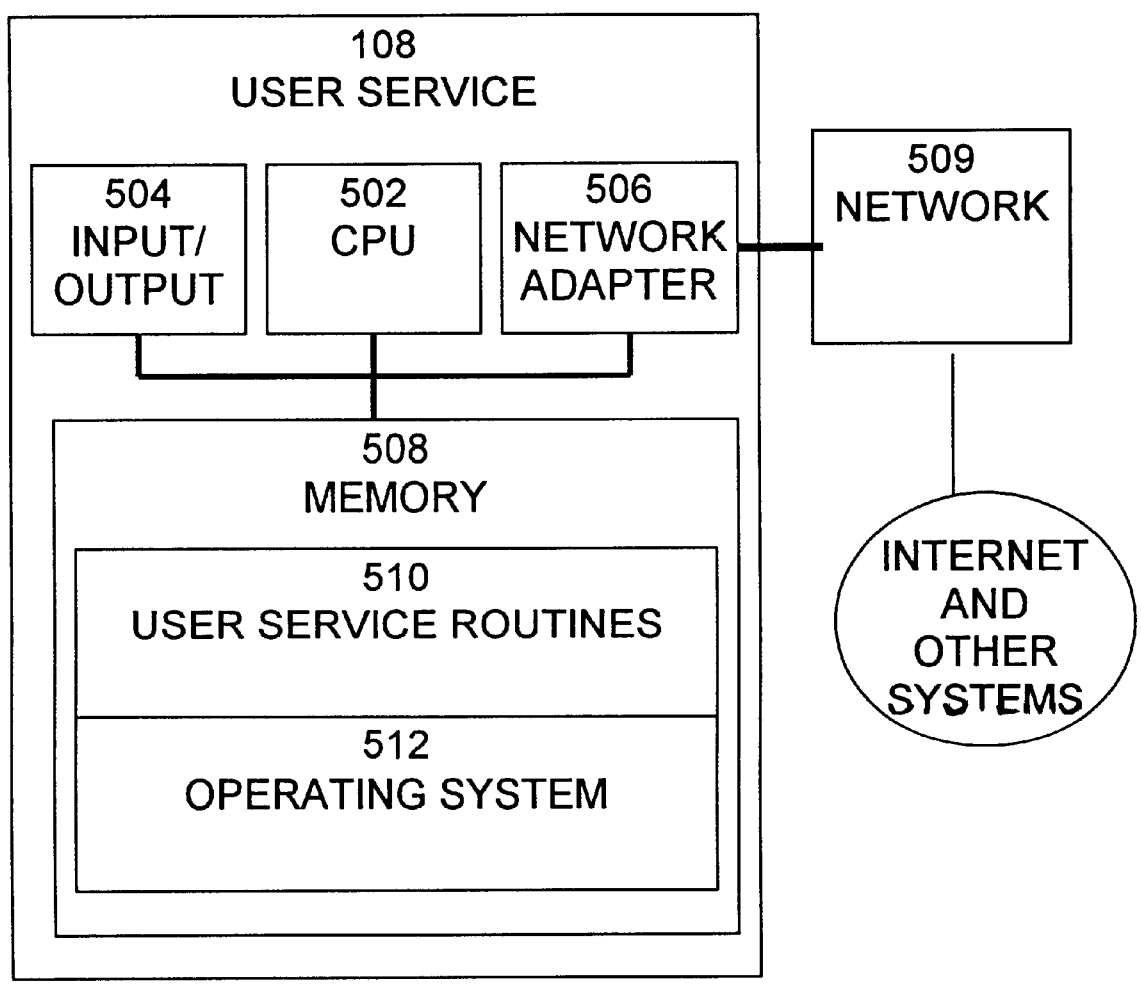
FIG. 5 is a more detailed block diagram of a search engine shown in FIG. 1.

User service block 108 is shown in more detail in FIG. 5. User service block 108 typically is, or is included in, a programmed general-purpose computer system, such as a personal computer, workstation, server system, and mini-computer or mainframe computer. User service block 108 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces User service block 108 with the network 509, which provides communication with the Internet and other systems, such as repository 106 and search engine 108. Network 509 may be any standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of the present invention. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface. Memory 508 includes a plurality of blocks of program instructions, such as update routines 510, and operating system 512. User service routines 510 provide Web-searching functionality to users of search engine system 100. Operating system 512 provides overall system functionality.

Figure 6:
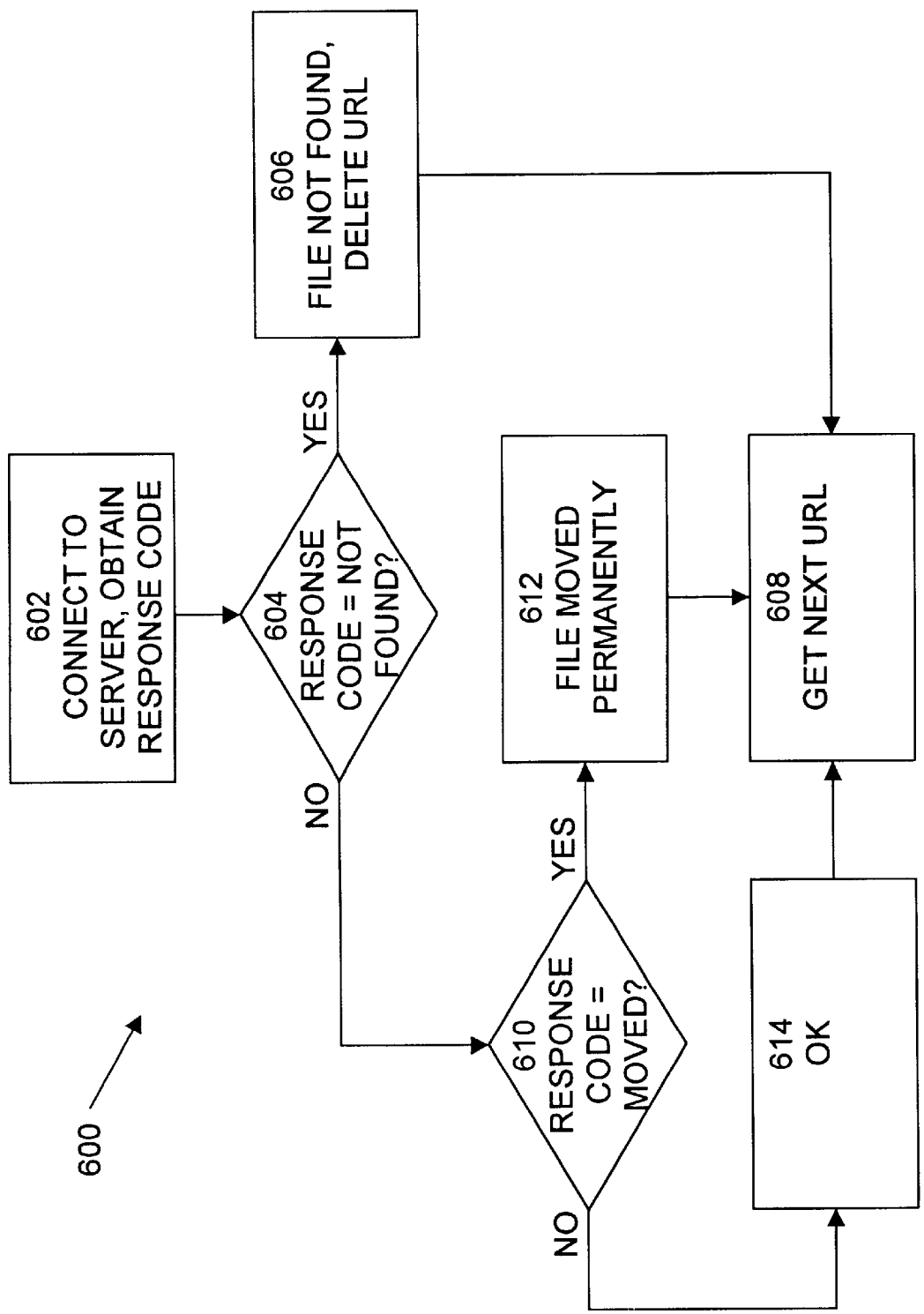
FIG. 6 is a flow diagram of a process, according to the present invention, which may be implemented in the system shown in FIG. 1.
Figure 7:
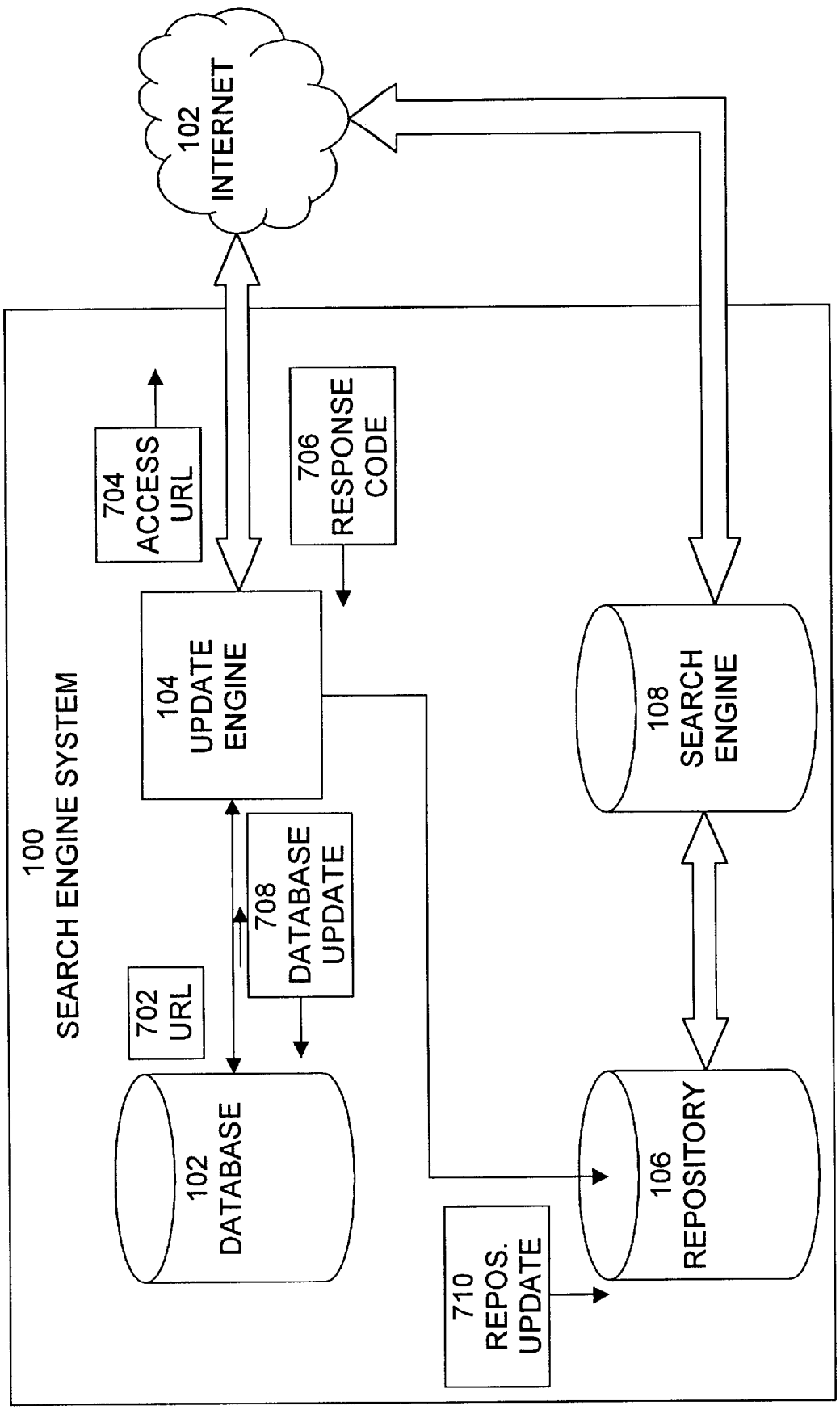
FIG. 7 is a data flow diagram of the operation of the process shown in FIG. 6 in the system shown in FIG. 1.

A process 600 for updating the link information in metadata summaries 406 is shown in FIG. 6. FIG. 6 is best viewed in conjunction with FIG. 7, which is a data flow diagram of the operation of process 600 in system 100 of FIG. 1. Process 600 begins with step 602, in which, for each distinct parent-URL 702 in data table 304 in database 102, update engine 104 makes a connection over the Internet 102 to perform an access 704 to the server on which the instant parent-URL 702 is indicated as residing and receives a response code 706. There are a plurality of response codes that may be received. The particular response codes used by process 600 are 1) a response code indicating that the requested page cannot be found by the server on which the page is indicated as residing (Not Found), 2) a response code indicating that the requested page has been permanently moved to a location indicated by a different URL than that in the table (Moved Permanently), and 3) a response code indicating that the requested page has been found (OK). In a typical implementation, an HTTP response code value of "404" indicates "Not Found," a response code value of "301" indicates a "Moved Permanently" response, and a response code value of "200" indicates "OK".

In step 604, the update engine determines whether the received response code is "Not Found". If so, then the process continues with step 606, in which a database update 708 and a repository update 710 occur. In the repository update, the summary of the URL is deleted from repository 106 and all the pages which reference this URL are updated to account for the broken link. In the database update, all occurrences of the URL are deleted from database 102. Depending on the implementation, each outdated link may either be annotated as "missing" or completely removed with its associated annotations. Alternatively, the summaries may be refreshed by updating the database first, then recrawling the affected URLs. The process then continues with step 608, in which the next URL is retrieved and the process begins again at step 602.

If, in step 604, it was determined that the received response code 706 was not "Not Found", then process 600 continues with step 610, in which it is determined whether the received response code 706 is "Moved Permanently". If the received response code 706 is "Moved Permanently", then the response message will include a field containing the new URL indicating the new location of the page. In step 612, information relating to the old URL is modified to reflect the new URL by performing a database update 708 and a repository update 710. In the repository update, the summary for the old URL is deleted and the new URL is then crawled. In this case, it does not suffice to simply modify the old summary because other metadata, such as data source information, will also have changed. The repository update 708 also includes updating the out-link metadata of all pages which reference this URL for the new location. Finally, the in-link metadata of all pages which are referenced by this URL are similarly updated. Alternatively, instead of updating each existing summary, all affected URLs may be recrawled with the updated database table to produce fresh summaries. The process then continues with step 608, in which the next URL is retrieved and the process begins again at step 602.

If, in step 610, the received response code is not "Moved Permanently", the process continues with step 614, in which it is verified that the response code is "OK". If so, no further action need be taken with respect to the current URL. The process then continues with step 608, in which the next URL is retrieved and the process begins again at step 602.

Figure 8:
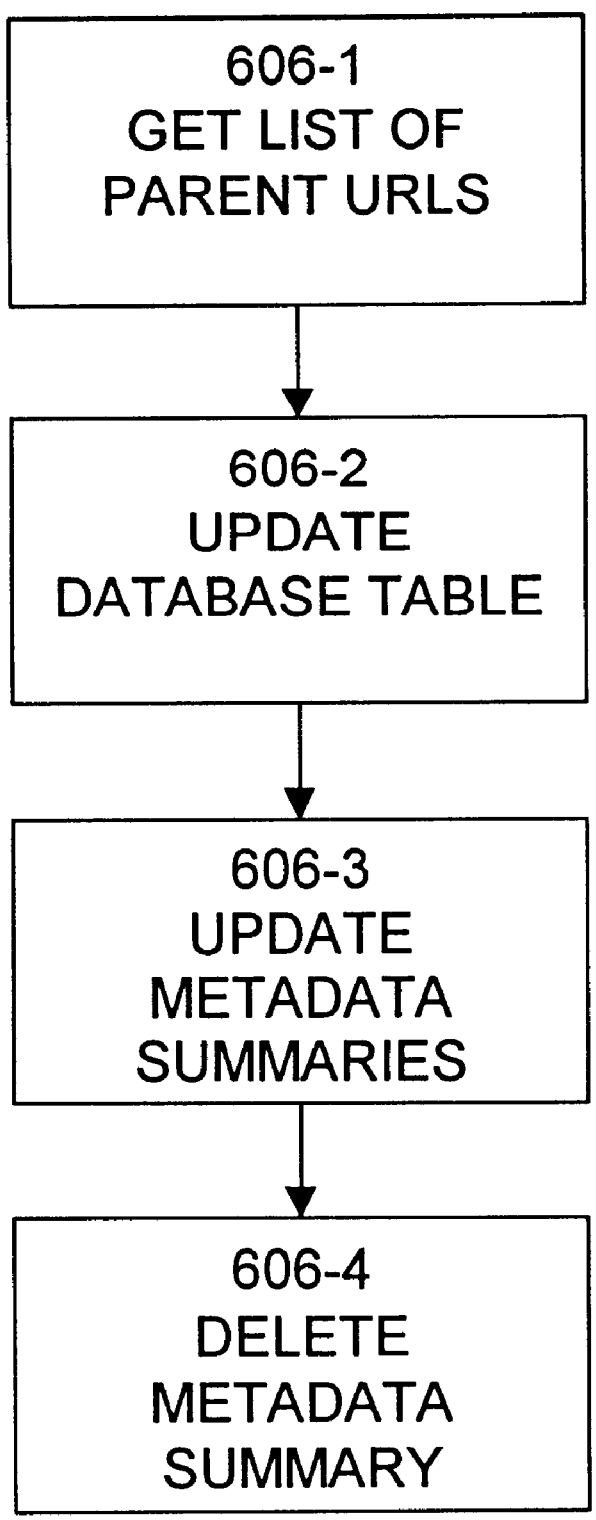
FIG. 8 is a flow diagram of a subprocess of a step in the process shown in FIG. 6.

The subprocess of step 606 of process 600, shown in FIG. 6, is shown in more detail in FIG. 8. The subprocess begins with step 606-1, in which update engine 104 gets a list of all the parent-URLs for the URL being processed from the database table 304. In step 606-2, database table 304 is updated by deleting all instances of the URL being processed, appearing as either a parent-URL or a child-URL, from the database table 304. In step 606-3, the metadata summaries 406 in repository 106 are updated. In one embodiment, the metadata summaries are updated by modifying existing RDF summaries for each parent-URL in database table 304 to remove references to the URL being processed and annotation information from its list of out-links. In another embodiment, each parent-URL in database table 304 is re-summarized to create new RDF summaries with the updated table information. In step 606-4, the metadata summary for the URL being processed is deleted from repository 106.

Figure 9:
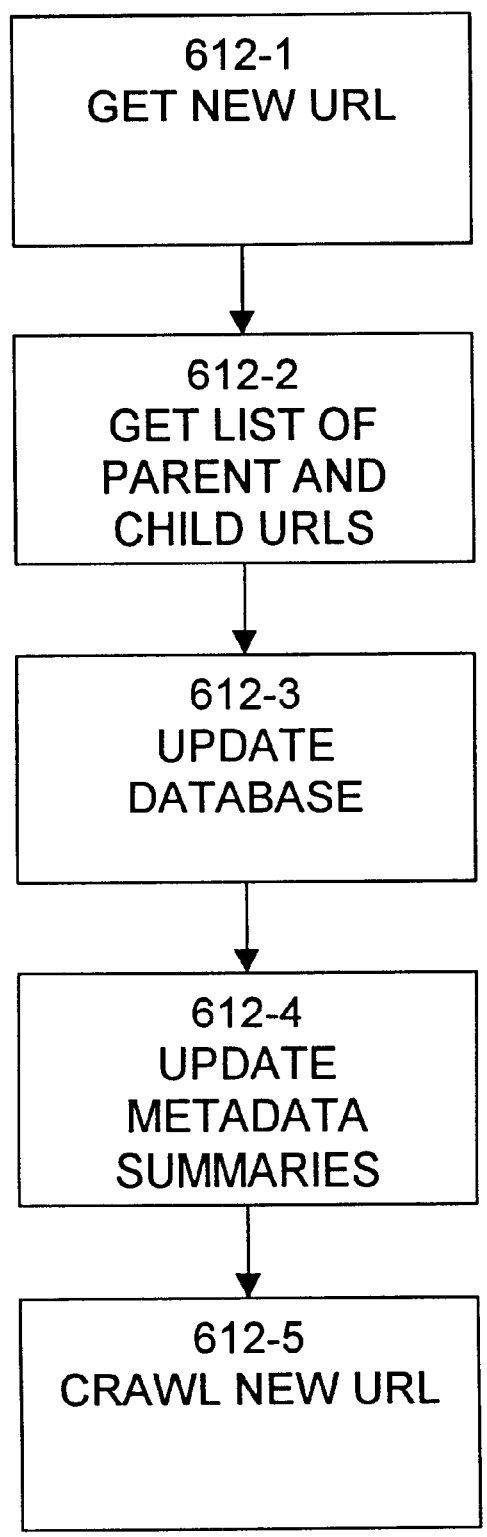
FIG. 9 is a flow diagram of a subprocess of another step in the process shown in FIG. 6.

The subprocess of step 612 of process 600, shown in FIG. 6, is shown in more detail in FIG. 9. The subprocess begins with step 612-1, in which update engine 104 obtains the URL (new URL) indicating the new location of the page indicated by the URL (old URL) being processed. In step 612-2, a list of all parent-URLs and child-URLs for the old URL are retrieved from the database table 304. In step 612-3, the database is updated by replacing all instances of the old URL, whether appearing as either parent-URL or child-URL, in the database table 304 with the new URL. In step 612-4 the metadata summaries 406 in repository 106 are updated. In one embodiment, the metadata summaries are updated by modifying existing RDF-summaries for each parent-URL and child-URL in database table 304 by replacing instances of the old URL with the new URL in the list of child and parent URLs obtained in step 612-2. Alternatively, each parent-URL and child-URL in the list of child and parent URLs obtained in step 612-2 may be summarized anew to create new RDF-summaries with the updated table information. In step 612-5, the new URL is crawled to update its metadata summary in repository 106 and the metadata summary for the old URL is deleted.

One of skill in the art would recognize that modifications and extensions may be made which are within the scope of the present invention. For example, the present invention may be easily extended to incorporate specific update protocols for other response codes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for updating search engine information comprising the steps of:
   selecting a uniform resource locator indicating a Web page for which the search engine information is to be updated;
   contacting a server on which the indicated Web page is located to obtain the Web page;
   receiving a response code indicating the status of the Web page; and
   updating the search engine information based on the response code,
      wherein when the response code indicates that the Web page cannot be found the updating step comprises the step of deleting information relating to the Web page from the search engine information, and
      wherein when the response code indicates that the Web page has been moved the updating step comprises the step of modifying information relating to the Web page that is included in the search engine information, and wherein the deleting step comprises the steps of receiving a plurality of parent uniform resource locators related to the selected uniform resource locator;

deleting all instances of the selected uniform resource locator from the search engine information;

updating metadata summarizing Web pages indicated by the plurality of parent uniform resource locators, the metadata referencing the selected uniform resource locator; and deleting metadata summarizing the Web page indicated by the selected uniform resource locator.

2. The method of claim 1, wherein the step of updating metadata summarizing Web pages comprises the step of:

modifying existing RDF summaries for each parent uniform resource locator in the search engine information to remove references to the selected uniform resource locator and annotation information from its list of out-links.

3. The method of claim 1, wherein the step of updating metadata summarizing Web pages comprises the step of:

resummarizing metadata information for each parent uniform resource locator in the search engine information to create new RDF summaries with updated information.

4. A method for updating search engine information comprising the steps of:

selecting a uniform resource locator indicating a Web page for which the search engine information is to be updated;

contacting a server on which the indicated Web page is located to obtain the Web page;

receiving a response code indicating the status of the Web page; and updating the search engine information based on the response code, wherein when the response code indicates that the Web page cannot be found the updating step comprises the step of deleting information relating to the Web page from the search engine information, and wherein when the response code indicates that the Web page has been moved the updating step comprises the step of modifying information relating to the Web page that is included in the search engine information, and wherein the modifying step comprises the steps of receiving a uniform resource locator indicating a new location of the Web page indicated by the selected uniform resource locator;

receiving a plurality of parent uniform resource locators and child uniform resource locators related to the selected uniform resource locator;

replacing all instances of the selected uniform resource locator with the uniform resource locator indicating the new location of the Web page;

updating metadata summarizing Web pages indicated by the plurality of parent uniform resource locators and child uniform resource locators, the metadata referencing the selected uniform resource locator;

crawling the uniform resource locator indicating the new location of the Web page to update metadata summarizing the Web page; and deleting metadata summarizing the Web page indicated by the selected uniform resource locator.

5. The method of claim 4, wherein the step of updating metadata summarizing Web pages comprises the step of:

modifying existing RDF summaries for each parent uniform resource locator in the search engine information by replacing the selected uniform resource locator with the uniform resource locator indicating the new location of the Web page among the plurality of parent uniform resource locators and child uniform resource locators related to the selected uniform resource locator.

6. The method of claim 4, wherein the step of updating metadata summarizing Web pages comprises the step of:

summarizing each parent uniform resource locator and child uniform resource locator among the received parent uniform resource locators and child uniform resource locators to create new RDF summaries.

7. A system for updating search engine information comprising:

means for selecting a uniform resource locator indicating a Web page for which the search engine information is to be updated;

means for contacting a server on which the indicated Web page is located to obtain the Web page;

means for receiving a response code indicating a status of the Web page;

means for updating the search engine information based on the response code, wherein when the response code indicates that the Web page cannot be found the updating means comprises means for deleting information relating to the Web page from the search engine information, and wherein when the response code indicates that the Web page has been moved the updating means comprises means for modifying information relating to the Web page that is included in the search engine information, and wherein the deleting means comprises means for receiving a plurality of parent uniform resource locators related to the selected uniform resource locator;

means for deleting all instances of the selected uniform resource locator from the search engine information;

means for updating metadata summarizing Web pages indicated by the plurality of parent uniform resource locators, the metadata referencing the selected uniform resource locator; and means for deleting metadata summarizing the Web page indicated by the selected uniform resource locator.

8. The system of claim 7, wherein the means for updating metadata summarizing Web pages comprises:

means for modifying existing RDF summaries for each parent uniform resource locator in the search engine information to remove references to the selected uniform resource locator and annotation information from its list of outlinks.

9. The system of claim 7, wherein the means for updating metadata summarizing Web pages comprises:

means for resummarizing metadata information for each parent uniform resource locator in the search engine information to create new RDF summaries with updated information.

10. A system for updating search engine information comprising:

means for selecting a uniform resource locator indicating a Web page for which the search engine information is to be updated;

means for contacting a server on which the indicated Web page is located to obtain the Web page;

means for receiving a response code indicating a status of the Web page;

means for updating the search engine information based on the response code, wherein when the response code indicates that the Web page cannot be found the updating means comprises means for deleting information relating to the Web page from the search engine information, and wherein when the response code indicates that the Web page has been moved the updating means comprises means for modifying information relating to the Web page that is included in the search engine information, and wherein the modifying means comprises means for receiving a uniform resource locator indicating a new location of the Web page indicated by the selected uniform resource locator;

means for receiving a plurality of parent uniform resource locators and child uniform resource locators related to the selected uniform resource locator;

means for replacing all instances of the selected uniform resource locator with the uniform resource locator indicating the new location of the Web page;

means for updating metadata summarizing Web pages indicated by the plurality of parent uniform resource locators and child uniform resource locators, the metadata referencing the selected uniform resource locator;

means for crawling the uniform resource locator indicating the new location of the Web page to update metadata summarizing the Web page; and means for deleting metadata summarizing the Web page indicated by the selected uniform resource locator.

11. The system of claim 10, wherein the means for updating metadata summarizing Web pages comprises:

means for modifying existing RDF summaries for each parent uniform resource locator in the search engine information by replacing the selected uniform resource locator with the uniform resource locator indicating the new location of the Web page among the plurality of parent uniform resource locators and child uniform resource locators related to the selected uniform resource locator.

12. The system of claim 10, wherein the means for updating metadata summarizing Web pages comprises:

means for summarizing each parent uniform resource locator and child uniform resource locator among the received parent uniform resource locators and child uniform resource locators to create new RDF summaries.

13. A computer program product for updating search engine information, comprising:

a computer readable medium;

computer program instructions, recorded on the computer readable medium, executable by a processor, for performing the steps of selecting a uniform resource locator indicating a Web page for which the search engine information is to be updated;

contacting a server on which the indicated Web page is located to obtain the Web page;

receiving a response code indicating a status of the Web page; and updating the search engine information based on the response code, wherein when the response code indicates that the Web page cannot be found the updating step comprises the step of deleting information relating to the Web page from the search engine information, and wherein when the response code indicates that the Web page has been moved the updating step comprises the step of modifying information relating to the Web page that is included in the search engine information, and wherein the deleting step comprises the steps of receiving a plurality of parent uniform resource locators related to the selected uniform resource locator;

deleting all instances of the selected uniform resource locator from the search engine information;

updating metadata summarizing Web pages indicated by the plurality of parent uniform resource locators, the metadata referencing the selected uniform resource locator; and deleting metadata summarizing the Web page indicated by the selected uniform resource locator.

14. The computer program product of claim 13, wherein the step of updating metadata summarizing Web pages comprises the step of:

modifying existing RDF summaries for each parent uniform resource locator in the search engine information to remove references to the selected uniform resource locator and annotation information from its list of out-links.

15. The computer program product of claim 13, wherein the step of updating metadata summarizing Web pages comprises the step of:

resummarizing metadata information for each parent uniform resource locator in the search engine information to create new RDF summaries with updated information.

16. A computer program product for updating search engine information, comprising:

a computer readable medium;

computer program instructions, recorded on the computer readable medium, executable by a processor, for performing the steps of selecting a uniform resource locator indicating a Web page for which the search engine information is to be updated;

contacting a server on which the indicated Web page is located to obtain the Web page;

receiving a response code indicating a status of the Web page; and updating the search engine information based on the response code, wherein when the response code indicates that the Web page cannot be found the updating step comprises the step of deleting information relating to the Web page from the search engine information, and wherein when the response code indicates that the Web page has been moved the updating step comprises the step of modifying information relating to the Web page that is included in the search engine information, and wherein the modifying step comprises the steps of receiving a uniform resource locator indicating a new location of the Web page indicated by the selected uniform resource locator;

receiving a plurality of parent;uniform resource locators and child uniform resource locators related to the selected uniform resource locator;

replacing all instances of the selected uniform resource locator with the uniform resource locator indicating the new location of the Web page;

updating metadata summarizing Web pages indicated by the plurality of parent uniform resource locators and child uniform resource locators, the metadata referencing the selected uniform resource locator;

crawling the uniform resource locator indicating the new location of the Web page to update metadata summarizing the Web page; and deleting metadata summarizing the Web page indicated by the selected uniform resource locator.

17. The computer program product of claim 16, wherein the step of updating metadata summarizing Web pages comprises the step of:

modifying existing RDF summaries for each parent uniform resource locator in the search engine information by replacing the selected uniform resource locator with the uniform resource locator indicating the new location of the Web page among the plurality of parent uniform resource locators and child uniform resource locators related to the selected uniform resource locator.

18. The computer program product of claim 16, wherein the step of updating metadata summarizing Web pages comprises the step of:

summarizing each parent uniform resource locator and child uniform resource locator among the received parent uniform resource locators and child uniform resource locators to create new RDF summaries.

* * * * *